Oct. 29, 1957 G. B. KARNOFSKY 2,811,539
SOLVENT EXTRACTION AND REMOVAL SYSTEM
Filed March 5, 1953 9 Sheets-Sheet 1
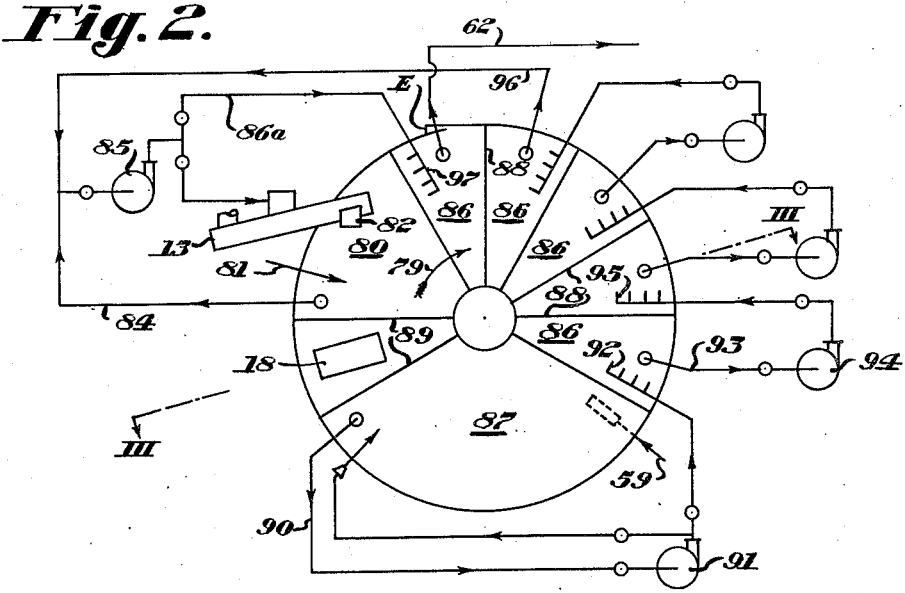
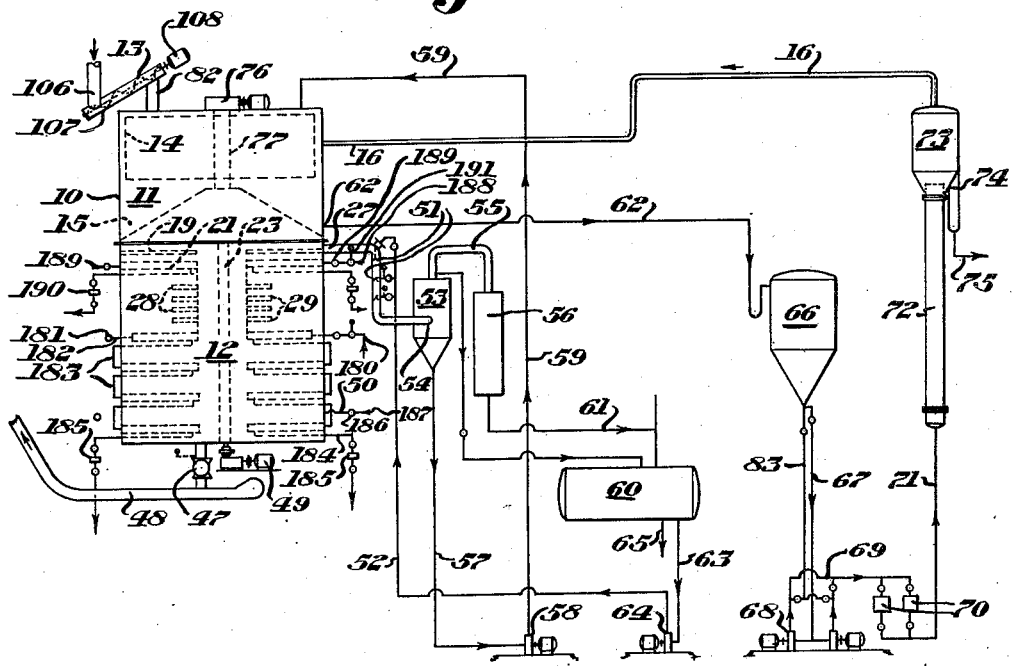
INVENTOR
GEORGE B. KARNOFSKY

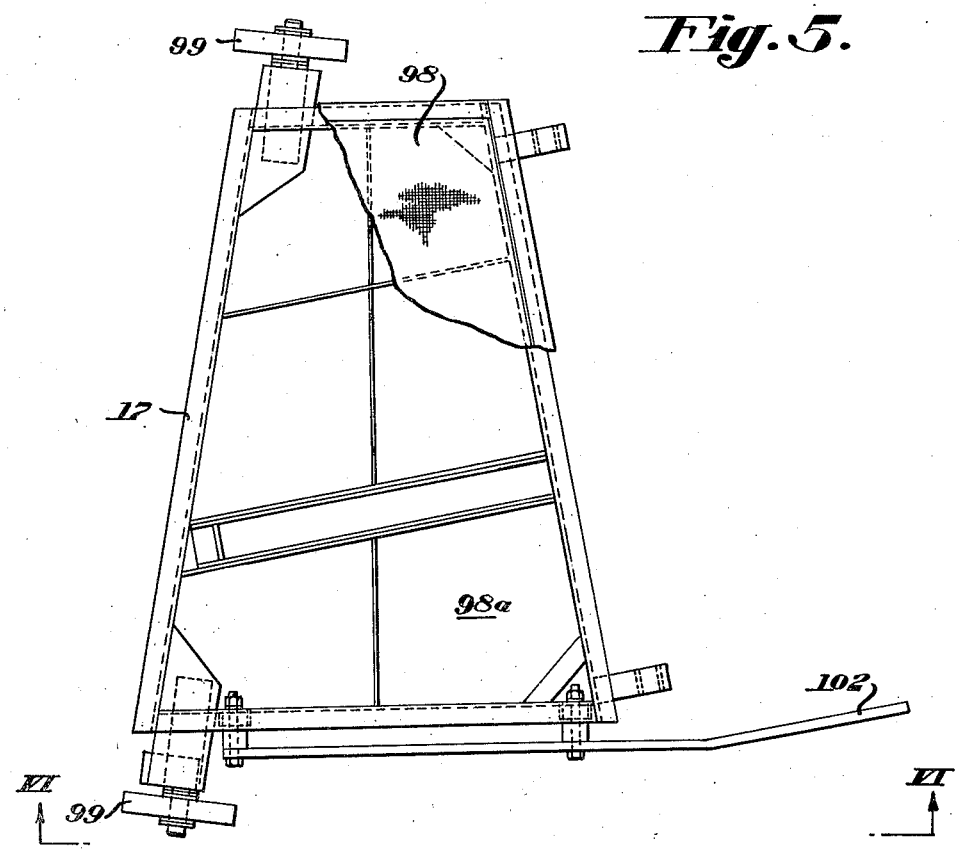
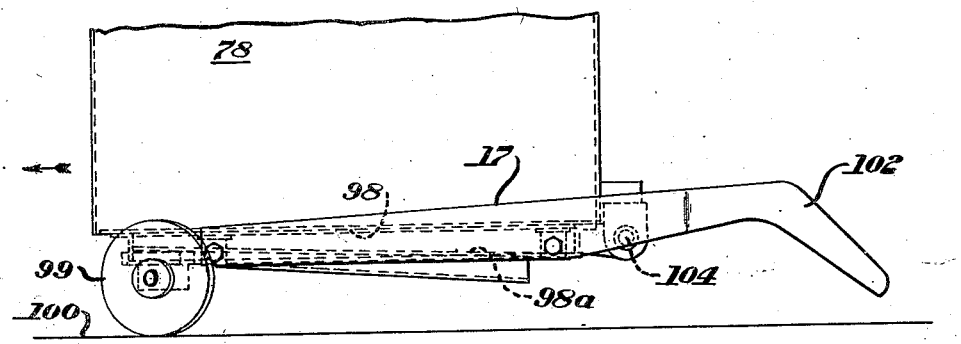

Oct. 29, 1957  G. B. KARNOFSKY  2,811,539
SOLVENT EXTRACTION AND REMOVAL SYSTEM
Filed March 5, 1953  9 Sheets-Sheet 4
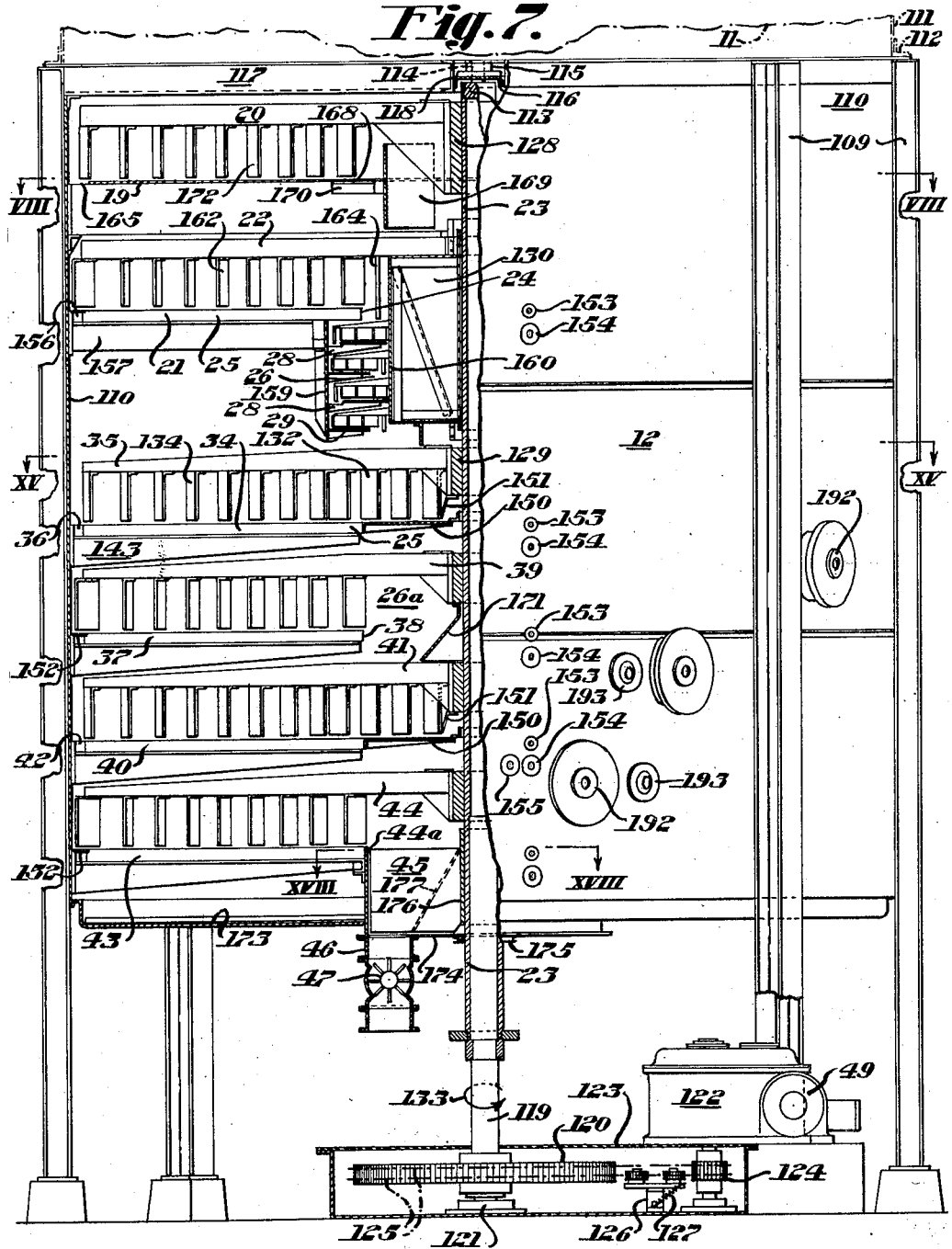
INVENTOR
GEORGE B. KARNOFSKY Oct. 29, 1957  G. B. KARNOFSKY  2,811,539
SOLVENT EXTRACTION AND REMOVAL SYSTEM
Filed March 5, 1953  9 Sheets-Sheet 5

INVENTOR
GEORGE B. KARNOFSKY

INVENTOR
GEORGE B. KARNOFSKY

Oct. 29, 1957  G. B. KARNOFSKY  2,811,539
SOLVENT EXTRACTION AND REMOVAL SYSTEM
Filed March 5, 1953  9 Sheets-Sheet 7

INVENTOR
GEORGE B. KARNOFSKY

Oct. 29, 1957    G. B. KARNOFSKY    2,811,539
SOLVENT EXTRACTION AND REMOVAL SYSTEM
Filed March 5, 1953    9 Sheets-Sheet 8

INVENTOR
GEORGE B. KARNOFSKY

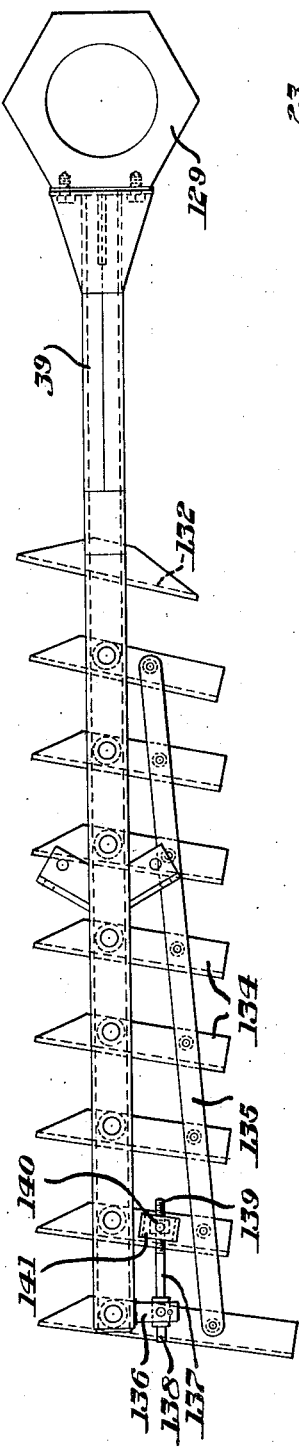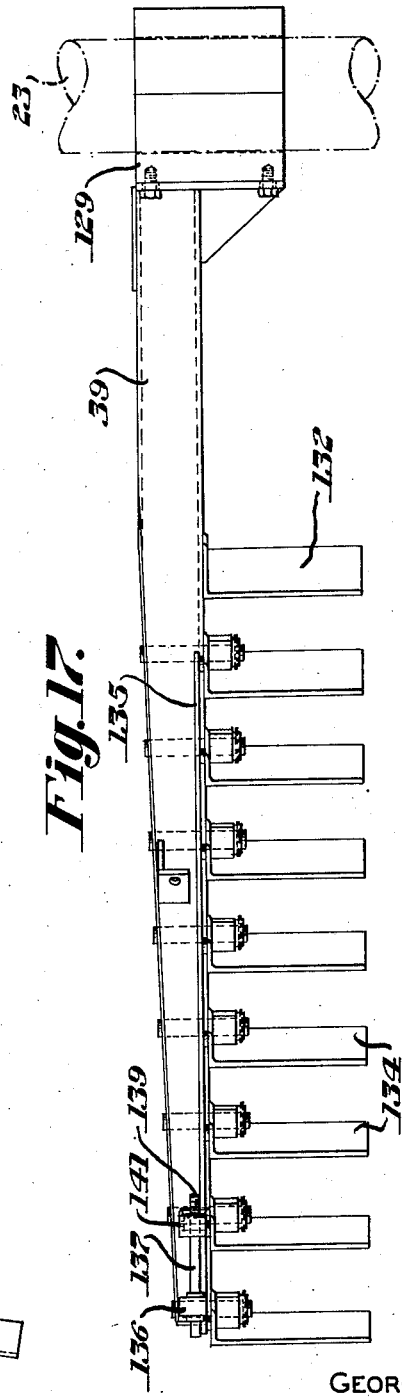

United States Patent Office 2,811,539
Patented Oct. 29, 1957

2,811,539

SOLVENT EXTRACTION AND REMOVAL SYSTEM

George B. Karnofsky, Fox Chapel Borough, Pa., assignor to Blaw-Knox Company, Pittsburgh, Pa., a corporation of Delaware Application March 5, 1953, Serial No. 340,627

21 Claims. (Cl. 260—412.4)

This invention relates to a continuous solvent extraction and removal system for the recovery of oil and solids from animal and vegetable particles. More particularly, this invention pertains to a new system for extracting, desolventizing and toasting solid organic particles in a new unitary structure.

In operations heretofore, the extraction of solid organic particles for the removal and recovery of oil and oil-soluble substances and the desolventizing and toasting of the extracted solids for the recovery of those solids, it has been customary to employ a plurality of vessels within which the various stages of operation were performed. As a consequence, there was not only an increased expense for equipment and handling, but overall control of the operation left much to be desired. Any non-uniformity that occurred on occasion might adversely affect the operation or the quality of the products. In many such operations, the treatment of the solids with steam, for example, in desolventizing and deodorizing them resulted in many cases in sodden and frequently in clogging masses of material in parts of the equipment. When those locations were difficult of access, undue delay and shutdown expense were incurred. Another difficulty frequently arose in that in the course of the desolventizing excess water vapor was present which if it condensed in certain parts of the equipment could augment the problem of proper operation and movement. In cases where sparging with steam has been employed in the course of desolventizing, it has been discovered that control of the water content of the solid product is difficult and often necessitates the employment of a subsequent water removal operation to meet moisture specifications. Such sparging has also occasioned excessive use of steam and steam loss, often with insufficiently effective contact between the steam and the solid material being desolventized and deodorized. Moreover, in such prior systems the control of vapor velocities in the apparatus was often troublesome with the result that proper movement of the materials was interfered with if not interrupted. Even in cases where pressure toasting has been done, there is a tendency for the solid product to be somewhat more dusty, lighter in weight and deeper in color.

Present day operations require the continuous treatment of sizable quantities of material with a minimum of equipment and a maximum of practical control regulation. The difficulties of the prior practices, some of which have been enumerated above, are overcome by this invention. In this invention, the extraction and solids desolventizing phases are continuous and take place in new apparatus which is far more economical and capable of being controlled and regulated for varying materials treated, than prior devices. Thus, in this invention, the solid organic particles may be continuously discharged from the extractor vessel with an optimum water content therein, desolventized substantially to a desired relatively final moisture content and directly contacted with steam in a deodorizing and toasting zone in a water vapor atmosphere conducive to effective deodorizing and proper toasting at relatively low vapor velocities. More specifically, a new system is provided with marked advantages in which there is a unitary structural relation between an extractor and a desolventizer, and preferably also, between such desolventizer and a deodorizer below said desolventizer to facilitate the interaction of flakes from the desolventizer and steam from the toasting zone. Further, provision is made for returning vaporized solvent from outside of the new unitary structure to such extractor and thence to such desolventizer with consequent thermal benefit to and insurance against condensation of water in such extractor. In addition, new means are provided for flexibly controlling the various flows and proportions throughout the new unitary structure. The new system is also characterized by an ease of operation and of starting which has been difficult if not impossible to attain in other practices heretofore used.

Other objects and advantages of this invention will be apparent from the following description and from the following drawings, which are illustrative only, in which:

Figure 1 is a flow diagram embodying the new system of this invention and diagrammatically showing a portion of the new unitary structure therein;

Figure 2 is a schematic plan view of an extractor circuit which may be in the embodiment shown in Figure 1;

Figure 5 is a somewhat enlarged view in plan of a bottom door of the kind hinged to the trailing radial edge of each of the cells shown in the extractor set forth in Figures 3 and 4;

Figure 6 is a view in elevation taken along line VI—VI of Figure 5 illustrating such a door in its closed position and connected to such a cell;

Figure 7 is a view in elevation, partly in section, disclosing the lower vessel part of the new unitary structure of this invention set forth in the embodiment schematically shown in Figure 1;

Figure 16 is a somewhat enlarged detailed view of a single rake arm from a spider assembly with the rake teeth thereon adjusted for raking inwardly toward the center of the structure shown in Figure 7 as performed on the first and third tier trays shown therein;

Figure 17 is a view in elevation of the structure shown in Figure 16; and

*General description and operation*

Figure 3:
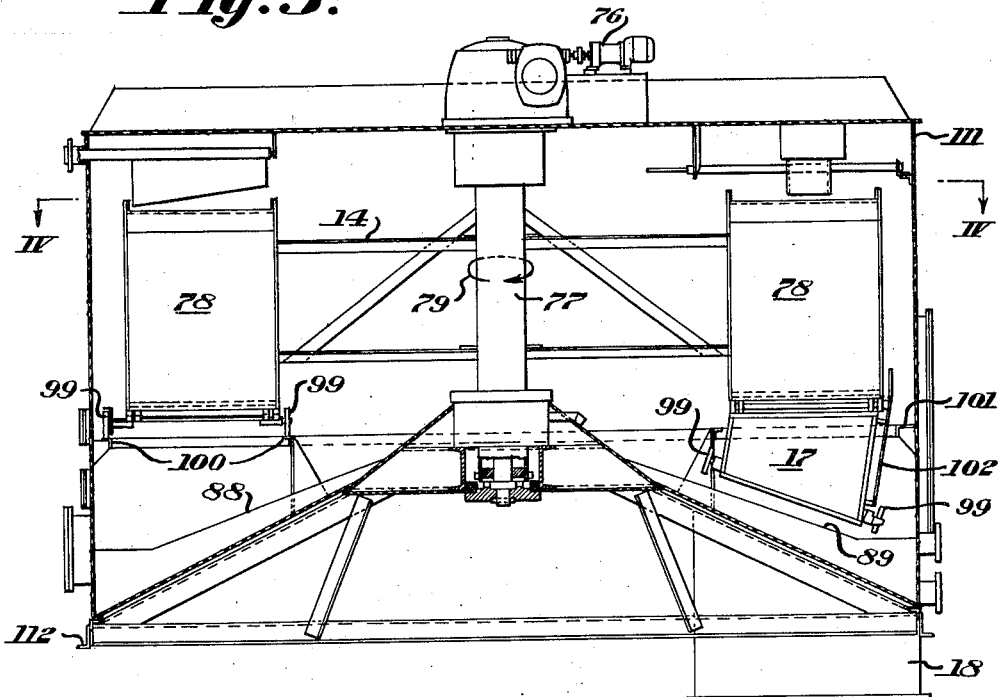
Figure 3 is a vertical section through the center of an extractor of a kind which may be used in the embodiment shown in Figures 1 and 2.

Referring to the drawings, a new combined extractor and desolventizer 10 is provided in which the extraction phase is performed in the upper part 11 thereof while the desolventizing phase, deodorizing and toasting phases are performed in the lower part 12 thereof, which lower part 12 may be broadly termed the desolventizing vessel. Soybean flakes containing oil and oil-soluble substances may be fed to a conveyor assembly 13 into extractor vessel 11. Therein, there is preferably a rotating frame 14 of radially separated cells 78 open at the top which are flooded in the course of rotation by liquid solvent of generally progressively increasing oil content pumped from underlying drainage compartments 15. Fresh solvent is continuously supplied through a pipe 59 to the interior of extractor 11 and applied as a solvent rinse to the respective cells prior to final drainage. Upon completion of a single circuit the doors 17 of the respective cells successively open dropping the drained extracted flakes downwardly through an opening 18 between vessels 11 and 12 upon an arcuate impact tray 19 in vessel 12.

A plurality of rake arms 20 in a spider assembly and carrying rakes 172 spread out the mass of extracted flakes on and across tray 19 in such a manner that the successive discharges of flakes from the successive cells in extractor 11 is converted into a continuous progression of the extracted flakes in vessel 12. In the course of their movement, the rakes 172 circumferentially and radially outwardly move the flakes on the impact tray toward the edges thereof. In the course of that movement the rakes have a harrowing action which because of the nature of the flakes usually tends to tumble the rows made by the rakes passing through the flakes in sweeping over the impact tray. The raking and harrowing movement causes the flakes to fall to the top steam tray 21 over which the rake arms 22 pass. The rakes on the rake arms 22 are set at an angle to sweep the flakes circumferentially and radially inwardly toward a desolventizer rotor shaft 23 carrying the respective rake arm assemblies in the respective tiers in vessel 12. In the embodiment shown, tray 21 is annular and is in the ninth tier from the bottom, the impact tray being the tenth or top tier. The innermost edge of tray 21 defines a circular opening 24 through which the flakes fall in the course of being raked. A zig-zag steam chamber 25 is affixed to the underside of each section of tray 21 to heat the tray and the flakes thereon in the solids desolventizing action which takes place in vessel 12 in the removal of residual solvent and liquid in the flakes discharged from extractor 11 through opening 18. Heating tray 21, utilizing a heating medium like steam, may be used to control to the desired extent whatever condensation of water vapor it may be desired to have occur substantially in a cascade zone 26, which may be constricted in size, adjacent to tray 21.

The restricted cascade zone 26 is provided below opening 24 to desolventize or at least complete the desolventizing of the solids and at the same time to accelerate the velocity of the vapors passing upwardly through zone 26, opening 24 and out through a vapor outlet pipe 27 connected to vessel 12 in the area of the gap between the ends of impact tray 19. Extended circular trays 28 forming the sixth and eighth tiers alternate with short annular trays 29 forming the fifth and seventh tiers in vessel 12. Rake arms 30 sweep over the trays 28 and have rakes thereon to move the flakes circumferentially and radially outwardly to fall upon the trays 29 respectively. Rake arms 31 sweep over the trays 29 and have rakes therein which move the flakes circumferentially and radially inwardly to fall through the respective openings 32 and 33. Throughout, it will be noted that the path of the solids in profile is generally sinusoidal and in plan is generally circumferential and either radially inward or radially outward as the case may be.

In the desolventizing of the extracted solid organic particles, water vapor enters zone 26 from deodorizing and toasting zone 26a therebelow in vessel 12, to flow countercurrent to the cascading flakes. Solvent is vaporized from the flakes, while at the same time steam is condensed upon the flakes, at a temperature below the boiling point of water. Sufficient steam is introduced from zone 26a to ensure substantially complete replacement of solvent in the flakes with water in the zone 26. In the case of soybean flakes extracted with hexane, for example, the moisture content of the substantially desolventized flakes leaving the zone 26 will be about 20%.

The path of the flake solids falling through opening 33 causes them to land upon a fourth tier steam tray 34. On that tray, the rakes on rake arms 35 move the flakes circumferentially and radially outwardly to the peripheral opening 36 through which the solids fall and land upon a third tier steam tray 37. The respective steam trays are heated by steam chambers similar to steam chamber 25 on the underside thereof, the heat passing readily through the relatively thin plate of which the trays are made and maintaining an appropriate temperature on the surface of the tray in contact with the flakes being moved thereover by the respective rakes. On tray 37 the flakes are moved circumferentially and radially inwardly to fall through opening 38, such movement being caused by the rakes on rake arms 39.

A second tier steam tray 40 similar to tray 34 receives the solids falling through opening 38 and supports them while they are moved circumferentially and radially outwardly by the rakes on rake arms 41 until the flakes pass through the peripheral opening 42. A first tier steam tray 43 then receives the solids passing through opening 42 and by means of the rakes on rake arms 44 moves the solids circumferentially and radially inwardly until the solids, now both desolventized and toasted as those terms are understood in the art, fall into a discharge hopper 44a at the base of vessel 12. The rate of movement of the particles over the trays can be varied as desired to provide a predetermined detention time in zone 26a. Rotating blades 45 move the desolventized and toasted flakes into a solids outlet pipe 46 in which a rotary vane valve 47 is placed intermediate hopper 44a and a conventional flake elevator 48 which may be used to convey the flakes to cooling equipment or storage or otherwise as desired. The common shaft 23 in vessel 12 is rotated at the desired speed by a motor-reducer set 49.

A plurality of contact steam nozzles 50 admit steam to lower part 26a of vessel 12. As shown, such nozzles are placed between the first and second tier steam trays 43 and 40 respectively although they may be placed elsewhere below zone 26. Thereby, the flakes which are at their hottest as they progress toward the bottom of vessel 12 are in direct contact with the steam so admitted at connections 50, such contact being excellent because of the raking action and constant harrowing movement of the flakes on the respective trays. The respective temperatures of the flakes and steam are such that there is no condenstion of the steam in zone 26a to any extent material enough to make the flakes sodden or soggy or to raise their final water content above specification. Such direct contacting by steam from nozzles 50 gives effective deodorizing and toasting treatment and insures completion if required of the removal from the flakes of any residual solvent by the vaporization of such solvent both by means of such direct steam contact and by means of the heating of the flakes in their progression over the respective tray tiers. The restricted zone 26 accelerates the rate of flow of vapor entering that zone to insure condensation of sufficient steam to be absorbed by the flakes for the evaporation of all the liquid solvent therein as a vaporized azeotrope with water.

Flakes entering toasting zone 26a will have a water content approximating 20% by weight on a solvent-free basis. As the particles are progressed continuously downwardly through zone 26a over the heated trays, water will be evaporated from the flakes at temperatures sufficient to promote deodorizing and toasting, until the flakes leaving through the discharge hopper 44a are brought to a moisture content of about 12% to 14% by weight of water on a solvent-free basis. Water evaporated from the flakes on the heated trays is the major source of steam for the desolventizing zone 26; but to ensure complete desolventizing in the zone 26 some auxiliary steam may be admitted through the nozzles 50.

The vapors leaving through vapor outlet pipe 27 comprise solvent vapor circulated through the extractor from vapor pipe 16 and the solvent vapor and steam from the zone 26. A plurality of spray heads 51 placed in superposed relation in a vertical section of vapor outlet pipe 27, such nozzles being supplied with liquid solvent through a pipe 52 to scrub the vapors passing through pipe 27. Such vapors are conducted to a scrubber separator vessel 53 to which pipe 27 is preferably connected tangentially at 54. Thereby, in entering vessel 53, the solid fines in the vapors are knocked down allowing clean vapors to pass overhead and out through a vapor conduit 55, the other end of which is connected to a condenser 56. The liquid solvent and fine solids therein which collect in the bottom of separator 53 pass out through a pipe 57 and into a pump 58 which returns such liquid and fines through a pipe 59 to the solids in the cells on frame 14 in extractor 11. Pump 58 will preferably be selected so as to maintain liquid in pipe 57.

The effluent through vapor outlet pipe 27 will comprise solvent vapor circulated through the extractor from the vapor pipe 16 and a mixture of solvent and water vapor from the zone 26. This effluent, being relatively rich in solvent vapor and lean in water vapor, will not condense water on contact with the scrubbing solvent. Hence, the presence of an aqueous liquid phase in the scrubbing apparatus, separator, liquid pipes and nozzles and in the extractor is avoided, along with the consequent formation of emulsions and colloids which tend to foul such apparatus and to adversely affect continuous operation of the system.

As will be well understood by those skilled in the art, suitable vents and vent-condensing equipment and seals will be employed with the new apparatus and system for incondensible gas relief and release purposes. In general, the new system may be effectively operated at approximately atmospheric pressure within the extractor 11 and vessel 12.

In condenser 56, the clean vapors from conduit 55 are condensed and the liquid withdrawn through a condenser outlet pipe 61, the other end of which may be connected to tank 60. In tank 60, a separation is effected between solvent and water. Such solvent from tank 60 may be withdrawn through a pipe 63 and pumped by a pump 64 into pipe 52, preferably being returned to extractor 11 by pipes 57 and 59 and pump 58. In those cases in which the solvent used may be commercial hexane as in the case of the treatment of soybean flakes, pipe 63 will receive solvent from a solvent phase or layer in tank 60 above the aqueous phase, which aqueous phase may be withdrawn through a pipe 65 and sent to waste or other disposition made.

The oil-rich solvent termed miscella is withdrawn from extractor 11 through a pipe 62 as a liquid and conducted to a miscella reservoir tank 66 from which miscella is withdrawn at a desired rate through a pipe 67 by one or more pumps 68 which may pump such miscella through a pipe 69, alternately through strainers 70 of conventional construction, and out of such strainers into a pipe 71 connected to the base of a conventional rising film evaporator 72. In rising through evaporator 72, solvent vapor is generated to separate solvent, in the case of a hexane-oil solution from the solvent and oil solution. The solvent vapors rise in vapor dome 73 and passing from thence into lean solvent vapor inlet pipe 16. A liquid trap 74 at the base of vapor dome 73 has a pipe 75 connected thereto through which the oil, almost free of solvent, is withdrawn for steam stripping, filtering and finishing operations or other treatment as will be well understood, which may be desired. The lean solvent vapor returned to extractor 11 promotes the starting-up operation and furnishes useful heat for the extraction operation as well as excess vapor passing downwardly and outwardly through opening 18 to form a vapor seal between the extractor 11 and the desolventizing vessel 12 so that vapors from vessel 12 do not pass into extractor 11 through such opening 18. The solvent vapor entering the upper part of vessel 12 through opening 18 will also be sufficient in quantity to insure that water vapor in the effluent through vapor outlet pipe 27 is present in less than azeotropic proportion. The return of hot solvent vapor to extractor 11 through pipe 16 also provides insurance against unwanted condensation of any water vapor within extractor 11 where it might have a deleterious effect. The preferred tangential entry of the solvent vapor introduced into extractor 11 through pipe 16 avoids any tendency to unduly disturb the liquid flow within the extractor in the course of the continuous extraction operation therein. Thereby, effective control in the new system is further promoted in a manner not possible in prior practices.

*Extractor assembly*

Extractor vessel 11 may be constructed generally in accord with the structure and principle of operation disclosed in my copending application for U. S. Letters Patent, Serial No. 91,372, filed May 4, 1949. Thus, a motor-reducer set 76 may be employed to turn a shaft 77 to which the frame 14, containing the individual radially separated cells 78, is affixed. If the direction of rotation of vertical shaft 77 is in the direction indicated by the arrow 79 in Figure 3, the drainage compartments beneath the cell 78 may be arranged in the order shown in Figure 2. Above compartment 80 unextracted flakes in the form of a slurry from conveyor assembly 13 pass through discharge pipe 82 into a newly emptied and reclosed cell 78 in extractor 11, and some solvent and extracted oil will drain into such compartment. Liquid in the feed slurry draining into compartment 80 tends to carry with it a small proportion of the fines material present in the slurry. A nozzle 81 is connected to compartment 80 to discharge thereinto below frame 14 so that as each cell which has been emptied of its drained contents when above opening 18, passes over compartment 80, the door 17 of that cell will have been reclosed and liquid from nozzle 81 may be used to flush down compartment 80 particularly in the area around its discharge outlet. The liquid issuing from nozzle 81 may be miscella pumped thereto through a by-pass line 83 connected to a reservoir 66. Compartment 80 may be drained through a line 84 which by a pump 85 which, for example, may send the material drained from compartment 80 to conveyor tube 13 or nozzle 97 or to both or otherwise as desired.

A plurality of succeeding compartments 86 is provided in the direction of rotation of frame 14 terminating in a long drainage compartment 87. The various compartments are separated from one another by vertical partitions 88 and from discharge opening 18 by end walls 89 which form a funnel into opening 18. The length of compartment 87 is sufficient to result in thorough drainage of the extracted flakes in the respectively succeeding cells prior to the opening of door 17 on each cell when the cell moves above opening 18. As viewed in Figure 2, the compartments beginning with compartment 87 and moving counterclockwise to the first of the compartments 86 contain miscellas of increasing oil to solvent ratios brought about by the generally countercurrent operation that is effected. Thus, miscella from compartment 87 is pumped through a pipe 90 to a pump 91 to a nozzle 92. Miscella from the compartment next to compartment 87 in a counterclockwise direction is pumped through a pipe 93 by a pump 94 to a nozzle 95 and so on with respect to the compartments 86 with certain exceptions. As one possible exception, the compartment 86 which is once removed in a clockwise direction from compartment 80 may have the miscella therein pumped out by pump 85 through a pipe 96 either into conveyor tube 13 or through a pipe 86a and nozzle 97 over that compartment 86 which is next to compartment 80 in a clockwise direction. In that way, relatively concentrated miscella from compartment 86 which is once removed in a clockwise direction from compartment 80 may be filtered through the cell passing below nozzle 97 at the time being so that the drainage into compartment 86 next to compartment 80 will not only be a concentrated miscella but will also be in a relatively clear condition for withdrawal through pipe 62. If desired, the liquid accumulating in compartment 80 may also be pumped through nozzle 97 over the compartment 86 next to compartment 80.

Figure 4:
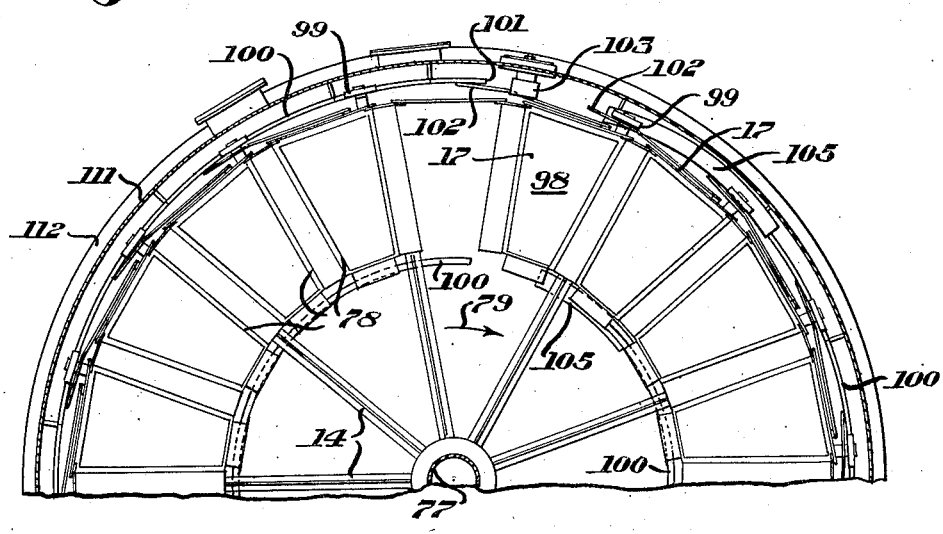
Figure 4 is a partial plan view taken generally along line IV—IV of Figure 3.

As illustrated in Figures 4 and 6, the doors 17 may be hinged to frame 14 at the trailing edge of the respective cells thereon, such doors comprising a planar screen 98 underlain by a spaced imperforate plate 98a for radial line drainage relative to the axis of extractor 11, the plate being tilted toward the trailing radial edge of the cell for drainage toward the trailing radial edge of the cell. The leading radial edge of each door 17 is provided with rollers 99 which ride on circumferential tracks 100 when the cells are above the respective drainage compartments. The tracks 100 terminate at 101 adjacent the end wall 89 bounding compartment 87 to permit the leading edge of the respective door 17 above opening 18 to swing down and open the cell to empty it. In that swinging, a conventional shock absorber may be mounted and employed to arrest the swinging movement of the door so it will not pass through its substantially full open position which is achieved when the door is hanging about straight down.

The outer side of the door frame is provided in each case with a rearward extension 102 which is successively engaged by a roller 103 as the opened cell door begins to move toward compartment 80. The shaft of roller 103 is fastened to the casing of extractor 11. Such engagement of roller 103 with extension 102 slightly raises rollers 99 about the door hinge 104 placing the outer roller 99 upon approach cam tracks 105 which complete the closing of the respective open doors 17 and merge at their upper rearward ends with the beginning of the tracks 100. Discharge of a fresh load of particles into each of the emptied cells through pipe 82 takes place after the door 17 to that cell has been closed as described.

As will be understood, in the operation of the extraction, solid organic particles like soybean flakes may come from a flaking machine and pass into an opening 106 in the lower end of conveyor conduit 13. Within such conduit there may be a helical screw conveyor 107 which is rotated by a motor 108 in a direction to elevate the flakes until they reach the opening in conduit 13 above the discharge pipe 82 whence they fall into a closed empty cell 78 therebeneath. A liquid seal is usually maintained in conveyor assembly 13 as described above in order to maintain a vapor seal so that no vapors may pass outwardly through pipe 82 and to form a slurry with the unextracted flakes which will enable them to settle quickly and relatively easily in the cells beneath the pipe 22. Appropriate speed of rotation of shaft 77, temperatures, pumping rates by the respective pumps and other factors are correlated for continuous operation. In starting up, hot solvent vapors of lean solvent introduced tangentially through pipe 16 into the casing of extractor 11 enables the operation to come up to operating temperature and go "on stream" relatively quickly without unwanted condensation. The casings of extractor 11 and desolventizing vessel 12 plus the various other connections are made tight so that any vapor or gas release is conducted solely through conventional venting or other equipment which may be supplied. Further, suitable lagging is generally employed on various items of equipment where desired to prevent heat exchange or loss.

*Desolventizing and toasting vessel assembly and operation*

A plurality of vertical columns 109 is provided in spaced arrangement about a cylindrical shell 110 for the desolventizing vessel 12 which casing 110 is attached to the columns 109. The casing 111 of extractor vessel 11 is superposed upon casing 110 and supported by angles 112 affixed to the top of the respective columns 109 and to the casing 111 which is otherwise structurally independent of desolventizing vessel 12. However, the superposed relation of the extractor 11 and the desolventizer and toaster 12 conserves heat and materially reduces the surfaces of the respective vessels 11 and 12 through which heat loss might otherwise occur. In addition, such superposed relation enables a more compact total structure to be constructed with the various auxiliary items of equipment shown in Figure 1 and described and/or herein capable of being grouped around the periphery of the cylinder 10 with a further saving of plot space and ease of access. Suitable glass covered sight openings 192 and light openings 193 may be provided between the levels of the respective tiers and circumferentially around vessel 12 for inspection purposes. If desired, an internal glass wiper may be provided to wipe the sight glasses.

The shaft 23 within desolventizer vessel 12 may be tubular throughout most of its length and provided with a plug 113 welded thereto at the top thereof, said plug having a necked portion 114 which revolves in a bearing 115. Bearing 115 is affixed to a plate 116 through which neck 114 extends to pass into bearing 115. Plate 116 is rigidly connected to a composite beam 117 extending across the top of vessel 12 between opposite columns to which beam 117 is riveted, welded or otherwise affixed. Braces 118 extend at right angles to beam 117 being connected thereto at their respective inner ends and to columns 109 at their respective outer ends. The lower end of shaft 23 is affixed to a gear shaft 119, the lower end of which is keyed to a sprocket drive wheel 120, extending therethrough into a roller thrust bearing assembly 121 which supports the moving parts in vessel 12. A motor-reducer set 122 is mounted on a platform 123 within which gear 120 turns. A sprocket pinion 124 is turned by motor-reducer set 122 and connected by a double sprocket chain 125 to gear 120 to turn shaft 23 at the desired speed. A chain-tensioning device 126 is held against a sprocket chain by a spring 127 to take up any slack therein.

A hub clamp 128 and shorter hub clamps 129 are split longitudinally and the longitudinal halves bolted together on opposite sides of shaft 23 to fasten said respective hubs to shaft 23. Generally, pins extending between hub and shaft are also used to immovably fasten the respective hubs to the shaft so there can be no displacement thereof in the course of rotation of the shaft. The hubs 128 and 129 may be provided with six vertical faces to which the respective rake arms in tiers one to four and ten, are bolted or otherwise affixed.

The rake arms in tiers five to nine, inclusive, are affixed to a cross braced drum 130 welded to shaft 23, the drum 130 rotating with the shaft 23. The rakes on the odd-numbered tiers of rake arms are positioned at an angle to the tangent to a horizontal circle having the axis of shaft 23 as a center and the distance to the vertical axis of the rake tooth as a radius, that angle being set in the general direction shown in Figure 16 to rake solid organic particles on the respective trays in the odd-numbered tiers circumferentially and radially inwardly. Conversely, the angle of the rake on the rake arms in the even-numbered tiers is set in the general direction shown in Figure 15 to rake the solid organic particles on the trays in the even-numbered tiers circumferentially and radially outwardly. In all such rakes, the rakes themselves divide and tumble the particles in causing their progression on the respective trays. Such division and tumbling assists in obtaining uniform treatment of all of the particles even in the lower tiers in zone 26a where the solid particles undergo a heating treatment to deodorize and toast them. The outermost rake tooth (as illustrated for one assembly in Figures 16 and 17) on one of the rake arms in each of the rake arm spider tier assemblies may be lengthened in a direction toward the inside of casing 110 to scrape close to without contacting said casing any solid material which may tend to adhere to the inside of such casing in the path of the lengthened rake tooth.

Figure 15:
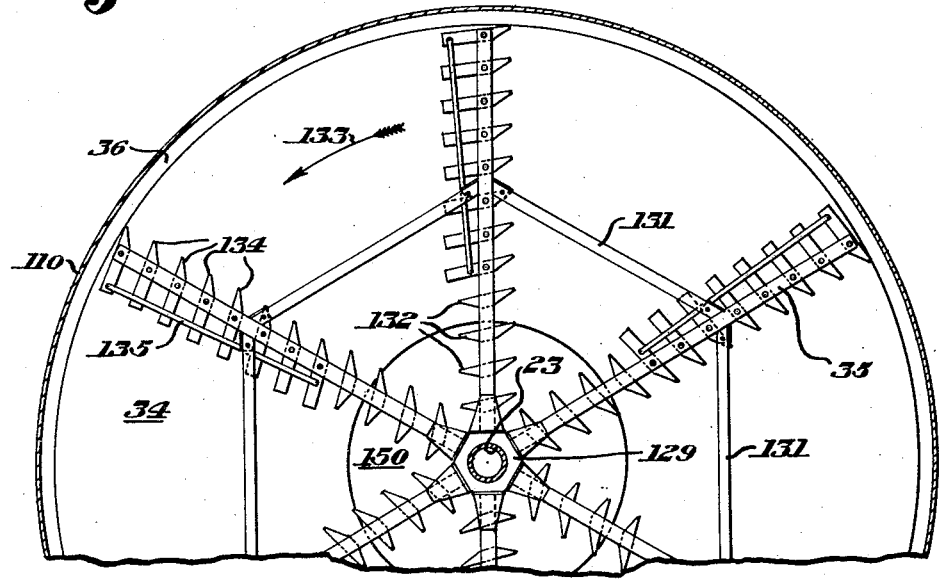
Figure 15 is a plan view of a part of a rake arm spider assembly taken generally along line XV—XV of Figure 7.
Figure 18:
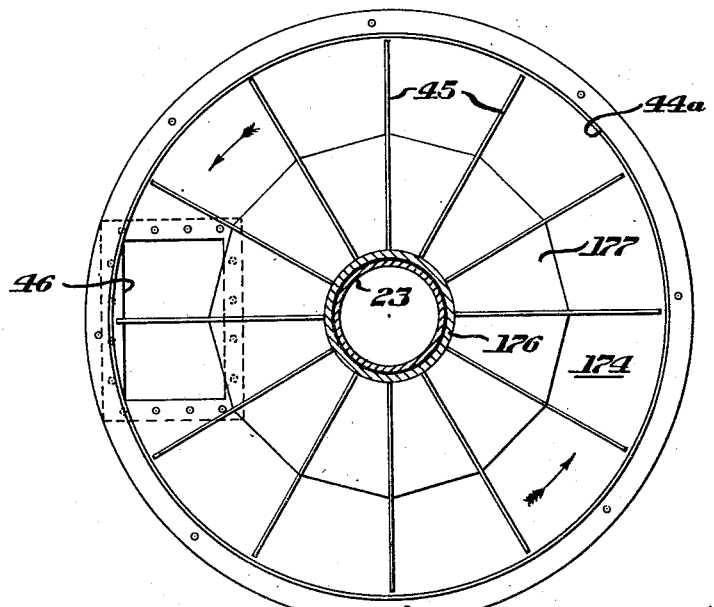
Figure 18 is a plan view of the discharge hopper subassembly shown in Figure 7 taken along line XVIII—XVIII thereof.

Specifically, Figure 15 illustrates the rake arms 35 on one of the raking outwardly tiers, the fourth serving for purposes of such illustration. As shown, the arms 35 are bolted to a hub 129, the arms 35 forming a spider joined by the braces 131. A plurality of affixed rakes 132 in the form of angles are welded to the underside of the arms 35 along the interior portions thereof, said rakes 132 having one flange welded to the arms and the other flange, a plane surface, depending therefrom and barely clearing the uppermost surface of tray 34. The leading vertical edge of the rakes 132 are nearer to the axis of shaft 23 than the trailing vertical edge, thereby giving the rakes the cant or angle desired so that in the rotation of shaft 23 in the direction indicated by arrow 133, the solid organic particles on tray 34 are moved circumferentially and radially outwardly. Since the tray 34 is circular and fitted relatively close about shaft 23, all of the particles thereon are pushed or moved into the peripheral gap or opening 36 between the outer edge of tray 34 and the inside of casing 110, whence the particles fall upon tray 37 as shown in Figure 7. Outwardly of the fixed rakes 132 on the arms 35 there are a plurality of adjustable rakes 134 having a pivotal connection between the underside of the arms 35 in the horizontal flange of the respective angles comprising the rake teeth 134. The adjustable rakes 134 are connected by a link 135 pivoted to each thereof for simultaneous movement. It will be noted that each link 135 is outwardly divergent relative to the respective arms 35. As a consequence, in the adjustment of rakes 134 the angle through which they are moved is inversely proportional to the distance between the respective rakes and shaft 23. In that way the rate of advance of material radially is inversely proportional to such distance in order to maintain relatively uniform the depth of material moved across a tray. As shown more fully in Figures 16 and 17, a bracket 136 is welded to the side of arms 35. An adjusting screw 137 is mounted in bracket 136 for rotatable but not for axial movement relative thereto and the outer end 138 of screw 137 is squared for turning by means of a wrench. The inner end 139 of screw 137 is threaded and passes through a nut 140 pivotally connected to a bracket 141 welded or otherwise affixed to the horizontal flange of one of the teeth 134 connected by the link 135. Hence, by rotating screw 137 in one direction or the other, the angle of the adjustable rake teeth 134 can be changed to correspondingly change the rate of movement of the particles moved by the rakes 134. In the described rake arm spider, the nearer the leading vertical edges of the rakes 134 are adjusted toward the axis of shaft 23, the greater the rate of movement of particles engaged by those rakes circumferentially and radially outwardly, and vice versa. The structure of the outwardly raking rake arm spiders shown in Figure 15 for tray 34 is similar for rake arm spider 41 in the second tier while the inwardly raking structure for the rake arm spider 39 as shown in Figures 16 and 17 is similar to the rake arm spiders 44 in the first tier and 22 in the ninth tier. In the embodiment shown, the rake teeth on the respective rake arms in the other tiers are fixed but at least the outer ones of such rake teeth may be similarly made adjustable if desired. By means of such adjustments, the detention time of the flakes in moving over the various trays in the new vessel 12 can be controlled not only over-all but also along particular portions of the over-all path traversed by the solids.

Figure 14:
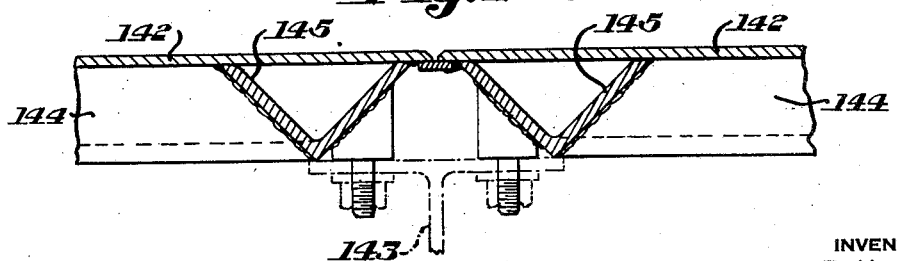
Figure 14 is a partial view of the adjoining edges of supported heating tray octants taken generally along line XIV—XIV of Figure 12.

Tray 34 is circular and for ease of construction is made up of a plurality of sectors which in the embodiment shown are octants. Each octant comprises a flat plate 142 bolted together or otherwise affixed, adjacent the respective edges thereof as shown in Figure 14 and in a manner whereby the joint does not extend above the top surface over which the particles smoothly pass, to inwardly extending cantilever beams 143 bolted to the respective columns 109 through the casing 110. The underside of each octant has welded thereto in arcuate arrangement the edges of the flanges of a plurality of angles 144 is spaced generally parallel arrangement. The open ends of the respective channels are closed by angles 145 in such a manner that successive pairs of the channels along each side communicate with one another, the pairs being staggered along the respective sides by the blanking-off partitions 146 and 147 respectively. A pipe fitting 148 admits steam to the outer end of the channels formed by the angles 144, the angles 145 and the partitions 146 and 147. The horizontal zig-zag or sinuous passage therethrough (see the steam path arrows in Figure 12) terminates in a condensate fitting 149 completing the steam chamber 25 affixed to the underside of each octant of each steam tray like steam tray 34. Steam trays 21, 37, 40 and 43 are constructed and supported in vessel 12 in generally the same manner. However, annular inward extensions 150 are affixed to the inner end of trays 34 and 40 so as to continue the upper surface thereof unbroken and extending substantially all the way in to the shaft 23 for the movement of particles thereover. The hubs 129 for the spiders of rake arms 35 and 41 are provided with deflector skirts 151 fastened to the underside of the hubs in question. Such deflector skirts prevent particles from falling into the small space between the innermost edge of extensions 150 of trays 34 and 40 and the side of the shaft 23 adjacent thereto.

Figure 12:
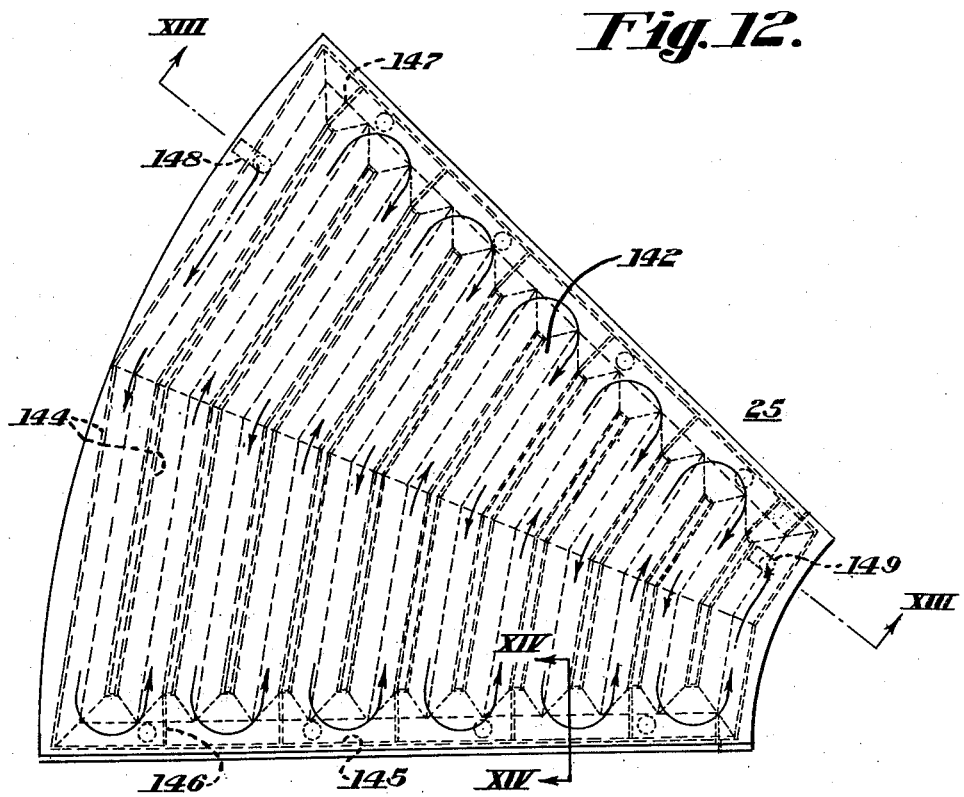
Figure 12 is a plan view of a heating tray octant of a kind which may be utilized in the first to fourth and ninth tier trays of the structure shown in Figure 7.
Figure 13:
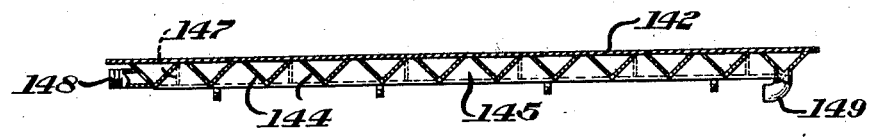
Figure 13 is a view in cross section taken along line XIII—XIII of Figure 12.

In the case of the annular steam trays 37 and 43 in the third and first tiers respectively, there is no inward extension corresponding to extensions 150 inasmuch as the particles on those trays are moved circumferentially and radially inwardly by the rakes on rake arms 39 and 44 respectively. Such rakes on rake arms 39 and 44, both the affixed rake teeth and the adjustable rake teeth, as shown in Figures 16 and 17, are set at an angle or angles as the case may be in which the vertical leading edge of the respective rakes are farther from the axis of shaft 23 than the respective trailing vertical edges thereof. Moreover, as shown, no rake teeth are provided on the arms 39 or 44 over the discharge openings 38 and 44a. Further, with the annular steam trays such as steam trays 37 and 43, sectors comparable to the octants in tray 34 can be employed and closure strips 152 are inserted substantially flush with the upper surface of the trays 37 and 43 to close the peripheral opening between the outer edge of the trays and the inside of the casing 110. Flange connections 153 and 154 are provided around the casing 110 and at the level of the respective steam trays for connection to the fittings 148 and 149 in each octant for steam at a pressure which in passing through the steam chambers 25 will produce the appropriate surface temperature on the respective steam trays. It will be noted that the steam chambers 25 against the underside of the respective steam trays as shown in Figures 12 to 14 provide heat quickly and directly to the particles passing over the respective trays particularly inasmuch as the surface metal 142 of the trays as shown in Figure 13 is relatively thin for rapid and efficient heat transfer to the solids. Moreover, the respective steam tray octants are superposed in vessel 26a directly above one another and each superposed set of such octants so far as the heating steam circuit goes, is a parallel circuit. As shown in Figure 1, heating steam enters through a heating steam inlet pipe 180 and passes into a manifold 181 surrounding casing 110 about the fourth tier level. Feed pipes 182 extending from manifold 181 admit steam into each of the fittings 153 in each of the octants in tray 34. Return fitting 154 for each octant of tray 34 is connected by a crossover pipe 183 to fitting 153 for the octant of tray 37 immediately below, and so on to the octants of the bottom steam tray 43. Hence, each vertical set of octants with their steam chambers is a series steam and condensate circuit. Return fitting 154 of each octant in tray 43 is connected by a heating steam outlet pipe 184 to an individual and separate steam trap 185 to maintain parallelism in the heating steam circuits for the respective vertical sets of octants in the heating trays in zone 26a.

In connection with steam tray 21, however, independence of control is retained for independence of regulation as described above by having the heating steam of appropriate pressure separately admitted through a steam inlet pipe 188 which enters manifold 189 and from thence passes separately into each fitting 153 into each of the octants of tray 21, the return fitting 154 from each of such octants having a separate steam trap 190. If desired, a temperature control 191 may be interposed between manifold 189 and inlet 188 to regulate the heating afforded by means of tray 21 in accordance with the temperature of the vapor effluent passing through vapor outlet pipe 27.

Process steam admitted through connections 50 may similarly be admitted around the periphery of casing 110, the nozzles or connections 50 being tapped into a surrounding manifold 186 supplied with process steam through a process steam inlet pipe 187.

Steam tray 21 in the ninth tier is provided with a closure strip 156 like closure 152 inasmuch as particles are moved over tray 21 circumferentially and radially inwardly to fall through opening 24. A cantilever beam 157 is provided for the sides of each octant of tray 21 like the beams 143 except that the outer ends of beams 157 are provided with brackets 158 to support a cylindrical outer wall member 159 by bolts connecting the two. Cylindrical wall 159 is the outer wall of the restricted zone 26, the inner wall being the vertical periphery 160 of drum 130. The various beams 143 and 157 may have their respective inner ends connected by braces or otherwise in the respective tiers for stiffening and structural support purposes. The outer side of wall 159 is provided with structural members to which the respective trays 28 and 29 are affixed, trays 28 being circular in that they extended substantially to without touching the wall 159 and have an annular opening 161 adjacent the inside of wall 159. The respective trays 29 are substantially annular in that there is no opening between wall 159 and such trays and the inner edge of such trays defines an opening respectively numbered 32 for the seventh tier tray and 33 for the fifth tier tray through which the particles drop in the course of their progression back and forth across the respective trays on alternate tiers in zone 26 in advancing toward the lower part 26a of the vessel 12.

Connected to shaft 23 and extending across the top of drum 130, there are the plurality of rake arms 22 having thereon rake teeth 162 which rake teeth on arms 39 and 44 are set at an appropriate angle to move the particles on tray 21 circumferentially and radially inwardly relative to the axis of shaft 23. As in the case of the first four tiers, the rake teeth at the outer end of 22 may be made adjustable in respect of the horizontal angle thereof. Shorter rake arms 30 and 31 comprise in each case in the embodiment shown a series of sixteen outstanding rake arms in each tier in restricted zone 26. Arms 30 and 31 have thereon rake teeth 163 depending toward their respective trays over which the bottoms of such rake teeth sweep and barely clear to cause the solid particle progression described herein in the appropriate direction. In addition, each of the rake arms 22, 30 and 31 are provided with rigidly dependent bars 164 which extend into the openings through which the particles fall toward the tier immediately below to prevent, in the area of the restricted zone 36, any agglomeration or piling up of masses of solid particles on any of the horizontal surfaces and ledges over which such pins respectively move in the course of the rotation of shaft 23.

Figure 8:
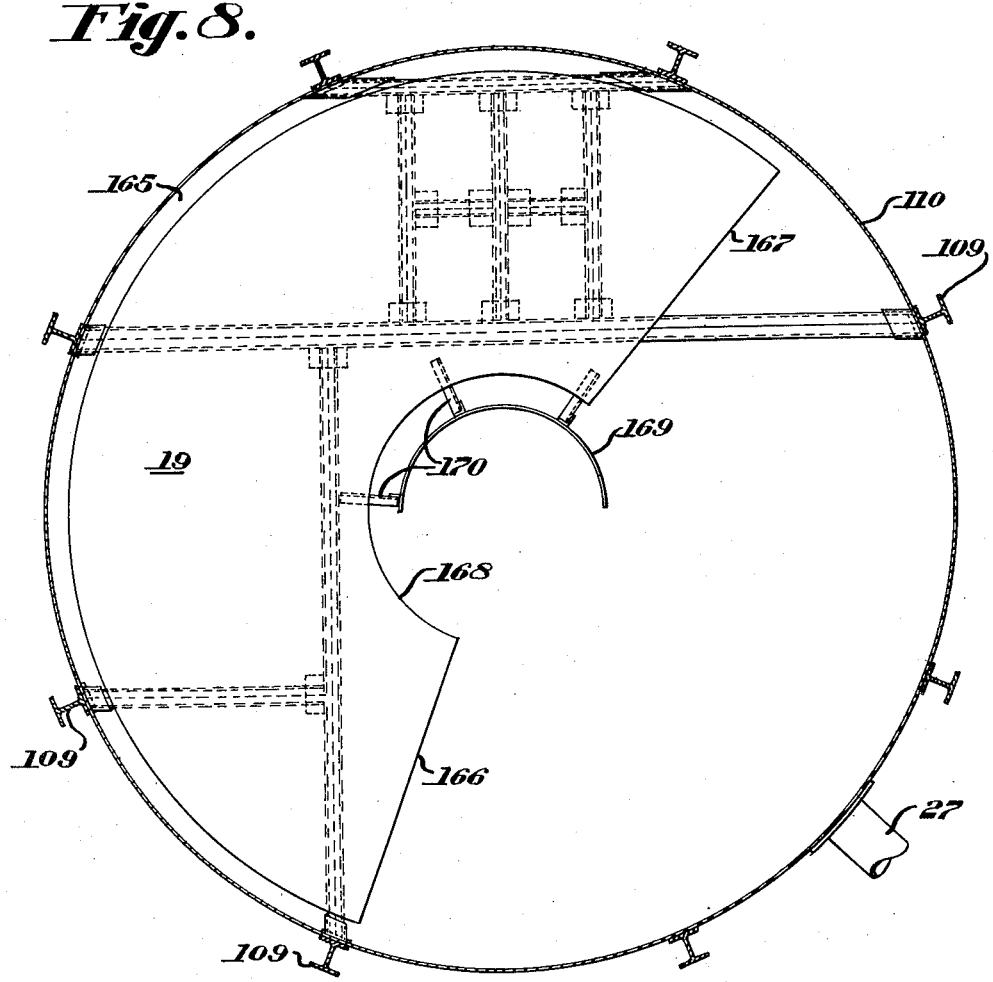
Figure 8 is a view in plan, somewhat enlarged, taken along line VIII—VIII of Figure 7, and showing the impact tray therein.
Figure 10:
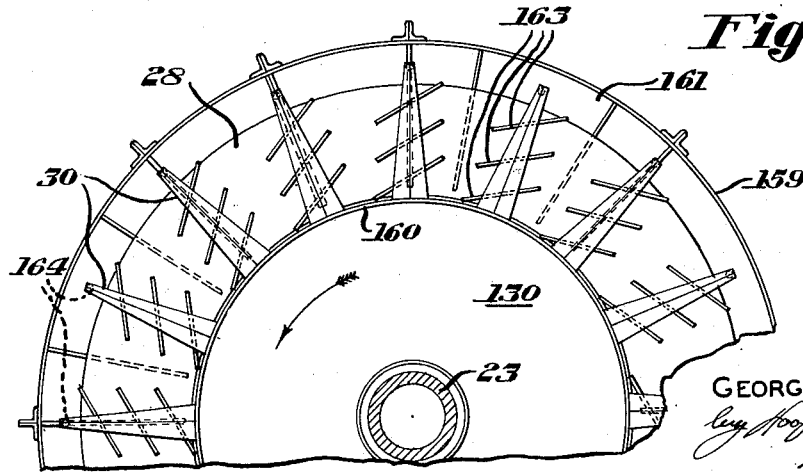
Figure 10 is a view in plan of the rotary raking structure in the zone shown in Figure 9 taken along line X—X thereof.
Figure 11:
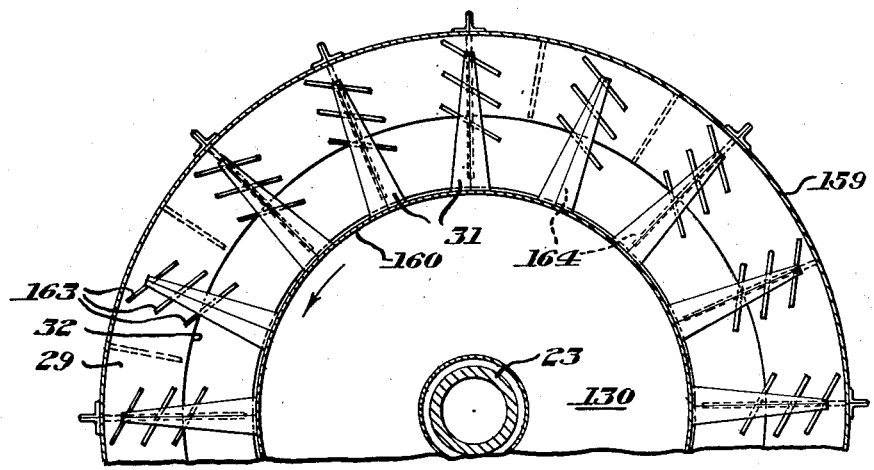
Figure 11 is a view in plan of the rotor raking structure in the zone shown in Figure 9 taken along line XI—XI thereof.
Figure 9:
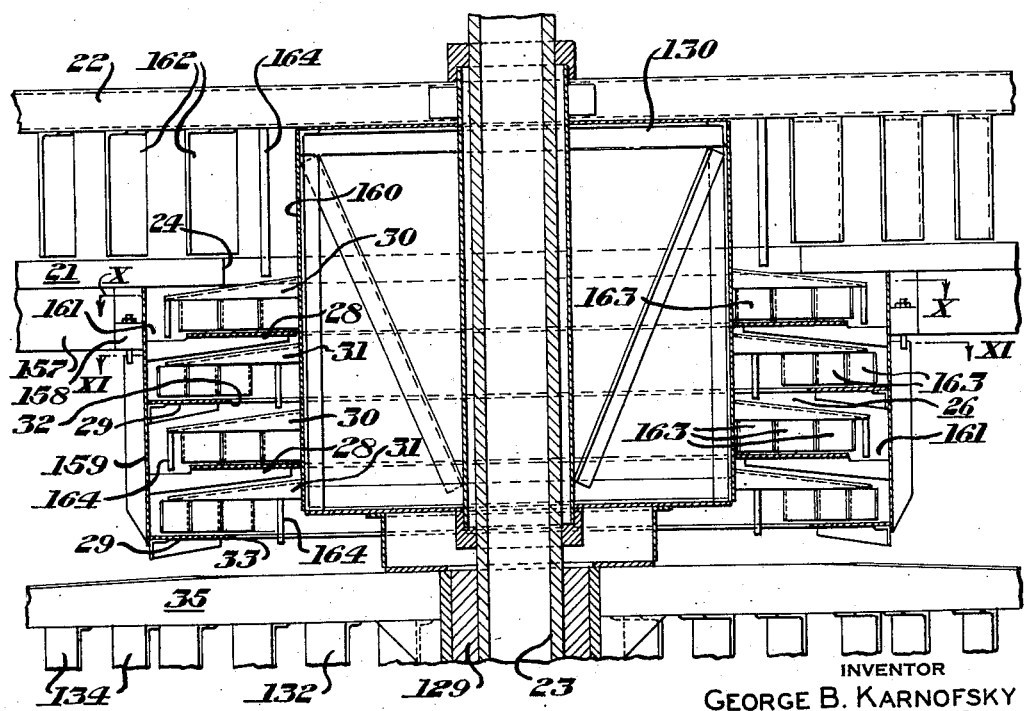
Figure 9 is a fragmentary view in elevation through the center of a restricted cascade zone in the part of the new unitary structure which is shown in Figure 7.

Impact tray 19 is arcuate and unheated in the embodiment shown. It is supported on structural members connected to the columns 109 through the casing 110. Tray 19 in addition to being arcuate is also annular in that a peripheral gap or opening 165 is provided between the outer edge of tray 19 and the inside of casing 110 adjacent thereto so that as the flakes or other solid particles are deposited upon tray 19, the rotation of rake arms 20 will cause the rakes depending therefrom to sweep over the upper surface of tray 19 and move the particles thereon circumferentially and radially outwardly so they may fall through the opening 165 and off the rear edge 166 of tray 19. Deposit of solid particles on tray 19 occurs near the forward edge 167 thereof in that opening 18 is positioned above that portion of tray 19. A central opening 168 has a cylindrical shield 169 spaced from the edge of opening 168 and connected to tray 19 by brackets 170. Shield 169 is also arcuate and offset relative to tray 19 about the axis of shaft 23, in a clockwise direction as viewed in Figure 8 for the purpose of insuring that in the event that there is any rebounding as particles drop through opening 18 onto tray 19, such will not fall atop and rest on drum 130. Instead, such rebounding particles will fall outwardly of shield 169 to the tier below. In that connection, a conical skirt 171 is also provided and affixed to the underside of the hub in the third tier for the spider of rake arms 39 to keep solid material raked into opening 38 from falling upon the hub area immediately below of the spider of raking arms 41.

Hub 128 is hexagonal in plan and supports a spider formed by six radiating rake arms 20, the said rake arms being connected to adjoining rake arms by braces as aforesaid. Affixed rakes 172 formed of angles having one flange affixed to the flat underside of the respective rake arms are provided. The vertical flange in the rake teeth 172 has the leading vertical edge nearer to the axis of shaft 23 thereby giving the radially outward movement to the solid particles deposited upon tray 19. The clearance between the bottom of the rake teeth and the upper surface of tray 19 is close enough, without contact, to insure movement along and off the tray 19 of the particles deposited thereupon. The rake teeth 172, as are the rake teeth on the other rake arm spiders, are so arranged that the trailing vertical edge of the respective teeth lies in a plane normal to the longitudinal axis of the supporting arm, which plane intersects the vertical flange of the adjoining rake tooth on that rake arm, to constitute an overlap of the respective rake teeth along each rake arm and insure movement of all particles along the respective trays, either inwardly or outwardly, depending, as described above, on the direction of the angle at which the rake teeth are set in the respective tiers. It will thus be seen that the path of solid particles undergoing desolventizing and toasting in vessel 12 is sinusoidal in profile, being back and forth across the progressively lower tiers, such back and forth movement being greater than the back and forth movement which occurs in the fifth to eighth tiers, inclusive, in restricted zone 26. The path of vapors moving in vessel 12 is also sinusoidal in profile but countercurrent to the path of the solid particles. Skirts 151 also have their lower edges generally sufficiently close to extensions 150 to assist in maintaining the vapor path in such a countercurrent relation to the solids path. Hence, contact between steam, other vapors and particles is efficient. Moreover, the restricted zone 26 is spaced from the top of vessel 12 causing the vapors from below zone 26 to accelerate when passing therethrough. The vapors rising through zone 26 have ready access to vapor outlet pipe 27 which is preferably connected to casing 110 in the area of the gap between the ends 166 and 167 of impact tray 19. Such vapors rising through zone 26 and generated within vessel 12 above zone 26 join with the vapors moving downwardly from extractor 11 through opening 18 to complete the vapor load passing out through pipe 27. As described above, the provision of solvent vapor introduction into extractor 11 through pipe 16, among other things, also insures the discharge of vapor through opening 18 to keep vapors from the desolventizer 12 out of the extractor 11.

Solid particles from tray 43 in the first tier are emptied into a discharge hopper 44a secured to a bottom plate 173 enclosing the bottom of casing 110. The bottom 174 of hopper 44a is provided with a bushing 175 surrounding shaft 23, suitable packing being in the bushing to prevent vapors or solids from passing out of vessel 12 along shaft 23. A hub 176 is affixed to shaft 23 and supports the radially extending vertical blades 45 which sweep the entire interior of hopper 44a to move the particles discharged thereinto over bottom plate 174 and into the discharge conduit 46. A conical web 177 extends between the blades 45 to keep any material from getting into any part of hopper 44a from whence it cannot be swept into discharge opening 46. The rotating vanes in the rotary vane lock 47 in conduit 46 may be turned by any suitable means such as the means which are used to move the flights or belt in the particle elevator 48.

Various modifications may be made in details of the new apparatus and system and in respect of connections and auxiliary items of equipment which may be utilized therein and therewith without departing from the spirit of the invention or the scope of the appended claims.

I claim:

1. In a solvent extraction and removal system, in combination, a cylindrical extractor vessel having means for separating solids and liquid and further having a liquid discharge outlet adjacent the bottom thereof, means for feeding solid particles to said vessel to be extracted, a cylindrical desolventizing vessel of similar horizontal cross sectional area, said vessels being mounted in immediately superposed relation to form a unitized structure, an opening for solids and vapors adjacent the bottom of said extractor vessel and extending between said vessels for the passage of non-liquid material therebetween means discharging the solid particles from the extractor vessel to the desolventizing vessel through said opening, at least one vapor outlet pipe in said desolventizing vessel for the removal of vapor from both said vessels, and means for removing desolventized solids from said desolventizing vessel.

2. In a solvent extraction and removal system, in combination, a cylindrical extractor vessel having means for separating solids and liquid and further having a liquid discharge outlet adjacent the bottom thereof, means for feeding solid particles to said vessel to be extracted, a cylindrical desolventizing vessel, said vessels being mounted in immediate superposed coaxial relation, an opening in the bottom of said extractor vessel for the discharge of solids into said desolventizing vessel, at least one vapor outlet pipe connected to said desolventizing vessel for the removal of vapor therefrom, means for introducing steam into a lower part of said desolventizing vessel to contact the solids passing therethrough, means including a constricted passage between said vapor outlet pipe and said means for introducing steam, and means for removing desolventized solids from said desolventizing vessel adjacent the bottom thereof.

3. In a solvent extraction and removal system, in combination, a desolventizing vessel, a plurality of trays in tiered relation surrounding a rotatable shaft, said trays having edges over which solids are discharged following movement over said trays, rake arms connected to said shaft extending over said trays in each tier thereof to sweep said solids circumferentially and radially toward the tray edges, intermediate lesser diameter ones of said trays defining a cascade zone and having a lesser area to accelerate vapors rising in said vessel, at least one of said trays above the bottom of said cascade zone having a heating chamber to regulate the condensation of vapor in said cascade zone, a vapor outlet pipe connected to said vessel above the bottom of said cascade zone, at least certain of said trays below the bottom of said cascade zone having a heating chamber to toast solids, and means for discharging desolventized and toasted solids adjacent the bottom of said vessel.

4. In a solvent extraction and removal system, in combination, a desolventizing vessel, a plurality of trays in tiered relation surrounding a rotatable shaft, said trays having edges over which solids are discharged following movement over said trays, rake arms connected to said shaft extending over said trays in each tier thereof to sweep said solids circumferentially and radially toward the tray edges, intermediate lesser diameter ones of said trays defining a cascade zone and having a lesser area to accelerate vapors rising in said vessel, at least one of said trays above the bottom of said cascade zone having a heating chamber to regulate the condensation of vapor in said cascade zone, a vapor outlet pipe connected to said vessel above the bottom of said cascade zone, an arcuate impact tray adjacent the top of said vessel and having the gap between its radial edges adjacent said vapor outlet pipe, rake arms connected to said shaft for sweeping over said impact tray, at least certain of said trays below the bottom of said cascade zone having a heating chamber to toast solids, and means for discharging desolventized and toasted solids adjacent the bottom of said vessel.

5. In a solvent extraction and removal system, in combination, a desolventizing vessel, said vessel being free of liquid-supplying means, means for supplying drained extracted solids to said vessel adjacent the top thereof, a plurality of trays therein in tiered relation surrounding a rotatable shaft, said trays having edges over which solids are discharged following movement over said trays, rake arms connected to said shaft and extending over said trays in each tier thereof, rake teeth extending between said rake arms and the surface of the tray over which the respective rake arms extend, at least certain of said trays having separate sectors in circumferentially adjoining relation, said sectors having integral zig-zag heating chambers on the underside thereof, respective sectors on respective ones of such trays being in superposed relation, and series heating fluid pipe connections to each set of such superposed sectors, adjoining sectors in such heating trays having parallel heating fluid pipe connections, and means for discharging extracted and desolventized solids from said vessel adjacent the bottom thereof.

6. In a solvent extraction and removal system, in combination, a desolventizing vessel, said vessel being free of liquid-supplying means, means for supplying drained extracted solids to said vessel adjacent the top thereof, a plurality of circular and annular trays therein in alternately superposed relation, said circular trays having an outer peripheral edge over which solids are discharged, said annular trays having an inner edge defining a central opening through which solids are discharged, said trays having sector sections, means for supporting the respective sectors in each of said trays, a steam chamber integral with the underside of the sectors in certain of said trays, rotatable rake arm spiders to be moved over each of said trays, the rake arms on said spiders having depending rakes extending toward the respective trays to sweep thereover and move solids thereon circumferentially and radially, the rakes cooperating with said circular trays having their leading vertical edges nearer to the axis of said vessel for radially outward movement, the rakes cooperating with said annular trays having their leading vertical edges farther from the axis of said vessel for radially inward movement, the paths of said rakes cooperating with each tray overlapping the paths of adjoining rakes, and means for rotating said rake arm spiders to move solids over said trays in a sinusoidal path as viewed in elevation, and means for discharging extracted and desolventized solids from said vessel adjacent the bottom thereof.

7. In a solvent extraction and removal system, in combination, a desolventizing vessel, said vessel being free of liquid-supplying means, means for supplying drained extracted solids to said vessel adjacent the top thereof, a plurality of circular and annular trays therein in alternately superposed relation, said circular trays having an outer peripheral edge over which solids are discharged, said annular trays having an inner edge defining a central opening through which solids are discharged, said trays having sector sections, means for supporting the respective sectors in each of said trays, a steam chamber integral with the underside of the sectors in certain of said trays, rotatable rake arm spiders to be moved over each of said trays, the rake arms on said spiders having depending rakes extending toward the respective trays to sweep thereover and move solids thereon circumferentially and radially, the rakes cooperating with said circular trays having their leading vertical edges nearer to the axis of said vessel for radially outward movement, the rakes cooperating with said annular trays having their leading vertical edges farther from the axis of said vessel for radially inward movement, the paths of said rakes cooperating with each tray overlapping the paths of adjoining rakes, means for adjusting the angle of at least certain of said rakes on at least certain of said rake arm spiders to vary the retention time of said solids on the tray or trays cooperating with said adjustable rakes, and means for rotating said rake arm spiders to move solids over said trays in a sinusoidal path as viewed in elevation, and means for discharging extracted and desolventized solids from said vessel adjacent the bottom thereof.

8. In a solvent extraction and removal system, in combination, a desolventizing vessel, said vessel being free of liquid-supplying means, means for supplying drained extracted solids to said vessel adjacent the top thereof, a plurality of trays therein in tiered relation surrounding a rotatable shaft, said trays having edges over which solids are discharged following movement over said trays, rake arms connected to said shaft and extending over said trays in each tier thereof, rake teeth extending between said rake arms and the surface of the tray over which the respective rake arms extend, means for shielding the connection between said rake arms and shaft against deposit of said solids, a discharge hopper adjacent the edge of the tray in the lowest tier, blades in said discharge hopper connected to said shaft, and an opening in said hopper, whereby when said shaft rotates, solids are progressed from tray to tray and discharged into said hopper where said blades move said solids through the opening therein.

9. In a solvent extraction and removal system, the steps comprising, solvent extracting solid particles in an extraction zone, introducing solvent vapor into said extraction zone, passing the extracted solids into a desolventizing zone for desolventizing, introducing at least some of said solvent vapor into said desolventizing zone at a rate sufficient to form a mixture with the water vapor present in less than azeotropic proportions in said desolventizing zone, and withdrawing vapor from said desolventizing zone.

10. In a solvent extraction and removal system, the steps comprising, solvent extracting and draining solid particles in an extraction zone, passing the drained extracted solids into a desolventizing zone for desolventizing, passing the drained extracted and desolventized solids into a toasting zone for toasting, introducing steam into said toasting zone for deodorizing and toasting, condensing at least a part of the water vapor present in said desolventizing zone, introducing a solvent vapor at least in said desolventizing zone to insure the formation of a mixture with uncondensed water vapor present in less than azeotropic proportions in said desolventizing zone, and withdrawing vapor from said desolventizing zone.

11. In a solvent extraction and removal system, the steps comprising, solvent extracting solid particles in an extraction zone, draining said solid particles, passing the drained extracted solids into a desolventizing zone for desolventizing, introducing solvent vapor at least into said desolventizing zone to insure the formation of a mixture of solvent and excess water vapor in said desolventizing zone in which the water vapor is present in less than azeotropic proportions, withdrawing vapor from said desolventizing zone, and scrubbing said withdrawn vapor with liquid solvent to remove entrained solid fines without condensing water.

12. In a solvent extraction and removal system, the steps comprising, solvent extracting and draining solid particles in an extraction zone, passing the drained extracted solids into a desolventizing zone for desolventizing, passing the drained extracted and desolventized solids into a toasting zone for toasting, introducing steam into said toasting zone for deodorizing and toasting, condensing at least a part of the water vapor present in said desolventizing zone, introducing a solvent vapor at least in said desolventizing zone to insure the formation of a mixture with uncondensed water vapor present in said desolventizing zone in which the water vapor is present in less than azeotropic proportions, withdrawing vapor from said desolventizing zone, and scrubbing said withdrawn vapor with liquid solvent to remove entrained solid fines without condensing water.

13. In a solvent extraction and removal system, the steps comprising, solvent extracting and draining solid particles in an extraction zone, passing the drained extracted solids into a desolventizing zone for desolventizing, introducing solvent vapor at least into said desolventizing zone to insure the formation of a vapor mixture of solvent containing all water vapor in said desolventizing zone in less than azeotropic proportions, withdrawing vapor from said desolventizing zone, scrubbing said withdrawn vapor with liquid solvent to remove entrained solid fines without condensing water, and returning at least the liquid resulting from said scrubbing to said extraction zone.

14. In a solvent extraction and removal system, the steps comprising, solvent extracting and draining solid particles in an extraction zone, passing the drained extracted solids into a desolventizing zone for desolventizing, passing the extracted and desolventized solids into a toasting zone for toasting, introducing steam into said toasting zone for deodorizing and toasting, condensing at least a part of the water vapor present in said desolventizing zone, introducing a solvent vapor at least in said desolventizing zone to insure the formation of a vapor mixture with uncondensed water vapor present in less than azeotropic proportions in said desolventizing zone, withdrawing vapor from said desolventizing zone, scrubbing said withdrawn vapor with liquid solvent to remove entrained solid fines without condensing water, and returning at least the liquid resulting from said scrubbing to said extraction zone.

15. In a solvent extraction and removal system, the steps comprising, solvent extracting solid particles in an extraction zone, draining said particles, passing the drained extracted solids into a desolventizing zone for desolventizing, passing the drained extracted and desolventized solids into a toasting zone for toasting, introducing steam into said toasting zone for deodorizing and toasting, condensing at least a part of the water vapor present in said desolventizing zone, introducing a solvent vapor at least in said desolventizing zone to insure the formation of a vapor mixture with uncondensed water vapor present in less than azeotropic proportions in said desolventizing zone, withdrawing vapor from said desolventizing zone, and varying the vapor velocity by changing the cross section of the vapor passage in the course of the countercurrent movement of vapor through said toasting zone and said desolventizing zone to insure replacement of solvent in said particles by water.

16. Apparatus for extraction of organic particles with solvents comprising in combination a vapor tight envelope generally cylindrical in form having a vertical axis of symmetry, a frusto-conical partition extending transversely across said envelope intermediate its ends, an extraction rotor comprising an endless series of extraction cells mounted for rotation above said partition, an open sector-shaped passage through said partition, means for removing liquid from said extraction cells outside said passage, means for discharging said extraction cells into said passage, a generally horizontal impact tray below said passage for collecting particles discharged from said extraction rotor, a vapor outlet through said envelope adjacent to said impact tray, a plurality of generally horizontal desolventizing and toasting trays serially arranged extending transversely of said envelope below said envelope, means for preventing accumulation of liquid in said envelope at least below said partition, rotary rakes adapted to sweep the upper surface of said trays, means for admitting steam into said envelope below the said frusto-conical partition, means for admitting solvent vapor into said envelope above said frusto-conical partition, and means for removing extracted and desolventized particles at the base of said envelope.

17. In a solvent extraction and removal system, in combination, a cylindrical extractor vessel having a rotor therein with a vertical axis of rotation, means for feeding solid particles to said extractor vessel to be extracted, means for supplying solvent solution to and draining it from said solid particles in said extractor vessel, means for removing drained extracted solid particles through an opening in and adjacent the bottom of said extractor vessel, a cylindrical desolventizing vessel having rotatable raking means with a vertical axis of rotation, said vessels being mounted in immediate superposed coaxial relation, tray means in said desolventizing vessel to receive and support drained extracted solid particles discharged from said extractor vessel, said tray means being in tiered relation in saaid desolventizing vessel and cooperating with said raking means to progress said solid particles downwardly through said desolventizing vessel, certain of said tray means intermediate the top and bottom of said extractor vessel having smaller openings communicating with adjoining tray means, an outlet for vapor connected to said desolventizing vessel adjacent the top thereof, means for heating tray means in the lower portion of said desolventizing vessel, means for rotating said raking means to progress said solid particles downwardly over said tray means, and means for discharging desolventized extracted particles from said desolventizing vessel adjacent the bottom thereof.

18. In a solvent extraction and removal system, the steps comprising, in combination, solvent extracting solid particles in an extraction zone, draining and discharging extracted solid particles into a solids desolventizing zone, supplying solvent vapor to said extraction zone at a rate sufficient to prevent vapor from said desolventizing zone entering said extraction zone, agitating and moving said solid particles through said desolventizing zone, heating said solid particles adjacent the discharge end of said desolventizing zone, withdrawing vapor from said desolventizing zone intermediate said extraction zone and said discharge end of said desolventizing zone, and withdrawing extracted and desolventized solid particles from the discharge end of said desolventizing zone.

19. In a solvent extraction and removal system, the steps comprising, in combination, solvent extracting solid particles in an extraction zone, draining and discharging extracted solid particles by gravity into a solids desolventizing zone, introducing solvent vapor from said extraction zone into said desolventizing zone adjacent said solid particles entering said desolventizing zone, agitating and moving said solid particles through said desolventizing zone inclusive of a constricted passage intermediate the respective entrance and discharge ends of said desolventizing zone, controllably heating said solid particles in respective portions of said desolventizing zone, withdrawing vapor from said desolventizing zone intermediate said extraction zone and said constricted passage, and discharging extracted and desolventized solid particles from the discharge end of said desolventizing zone.

20. In a solvent extraction and removal system, the steps comprising, in combination, solvent extracting solid particles in an extraction zone, draining and discharging extracted solid particles by gravity into a solids desolventizing zone, introducing solvent vapor from said extraction zone into said desolventizing zone at a rate sufficient to provide azeotropic proportions of solvent for all water vapor withdrawn from said desolventizing zone, agitating and moving said solid particles through said desolventizing zone inclusive of a constricted passage intermediate the respective entrance and discharge ends of said desolventizing zone, controllably heating said solid particles in respective portions of said desolventizing zone, withdrawing vapor from said desolventizing zone intermediate said extraction zone and said constricted passage, and discharging extracted and desolventized solid particles from the discharge end of said desolventizing zone.

21. In a solvent extraction and removal system, in combination, a cylindrical desolventizing vessel, means for introducing drained and extracted solids into said vessel adjacent the top thereof, a plurality of trays in tiered relation surrounding a rotatable shaft, respective trays having inner and outer edges over which solids are discharged following movement over said trays, rakes connected to said shaft and extending over said trays to rake and harrow said solids toward said tray edges, intermediate ones of said trays having a lesser tray area, and tray openings communicating with the other parts of said vessel on each side of said intermediate ones of said trays, an outlet for vapor connected to said vessel between the entrance end thereof for said solids and said intermediate ones of said trays, heating means for at least certain of said trays, and means for discharging solids adjacent the bottom of said vessel.

(References on following page)

References Cited in the file of this patent

UNITED STATES PATENTS

| | | |
|---|---|---|
| 668,297 | Powter | Feb. 19, 1901 |
| 2,554,109 | Langhurst | May 22, 1951 |
| 2,582,317 | Donohue | Jan. 15, 1952 |
| 2,585,793 | Kruse | Feb. 12, 1952 |
| 2,618,560 | Leslie | Nov. 18, 1952 |
| 2,695,304 | Barns | Nov. 23, 1954 |

FOREIGN PATENTS

| | | |
|---|---|---|
| 644,910 | Great Britain | Oct. 18, 1950 |
| 546,960 | France | Nov. 28, 1922 |